(12) United States Patent
Yeh et al.

(10) Patent No.: US 8,212,452 B2
(45) Date of Patent: Jul. 3, 2012

(54) LIGHT-TRANSMITTING VIBRATION UNIT AND MODULE THEREOF

(75) Inventors: Yu-Chou Yeh, Taoyuan County (TW); Min-Hui Chiang, Taoyuan County (TW)

(73) Assignee: J Touch Corporation, Taoyuan County (TW)

( * ) Notice: Subject to any disclaimer, the term of this patent is extended or adjusted under 35 U.S.C. 154(b) by 288 days.

(21) Appl. No.: 12/575,742

(22) Filed: Oct. 8, 2009

(65) Prior Publication Data

US 2011/0043077 A1 Feb. 24, 2011

(30) Foreign Application Priority Data

Aug. 21, 2009 (TW) .............................. 98128181 A

(51) Int. Cl.
*H01L 41/04* (2006.01)

(52) U.S. Cl. ........................................ 310/328; 310/800

(58) Field of Classification Search .................. 310/328, 310/800
See application file for complete search history.

(56) References Cited

U.S. PATENT DOCUMENTS

| | | | | |
|---|---|---|---|---|
| 5,359,253 A * | 10/1994 | Hikmet | ........................ | 310/357 |
| 6,738,050 B2 * | 5/2004 | Comiskey et al. | ............ | 345/173 |
| 2007/0059901 A1 * | 3/2007 | Majumdar et al. | ............ | 438/455 |
| 2007/0247033 A1 * | 10/2007 | Eidenschink et al. | ........ | 310/800 |
| 2008/0150905 A1 * | 6/2008 | Grivna et al. | ................. | 345/173 |
| 2008/0303782 A1 * | 12/2008 | Grant et al. | ................... | 345/156 |
| 2009/0167704 A1 * | 7/2009 | Terlizzi et al. | ............... | 345/173 |

FOREIGN PATENT DOCUMENTS

| | | |
|---|---|---|
| TW | I575024 | 2/2004 |
| TW | I249708 | 2/2006 |

* cited by examiner

*Primary Examiner* — Derek Rosenau

(74) *Attorney, Agent, or Firm* — Leong C. Lei

(57) ABSTRACT

In a light-transmitting vibration unit and the module thereof, which the vibration unit comprises a first and a second substrates stacked sequentially with each other, and made of a conductive polymer material, such that both first and second substrates have light transmittance and uniform resistance, and after a vibration driven component is electrically coupled to the first and second substrates, an electric field will be acted for converting electric energy into mechanical energy to produce vibrations. If the vibration unit is coupled directly to a touch-sensitive display unit, an image displayed by the touch-sensitive display unit will be able to pass through the vibration unit, and the vibrations produced by the vibration unit will be more directly transmitted to a touch object.

4 Claims, 11 Drawing Sheets

LIGHT-TRANSMITTING VIBRATION UNIT AND MODULE THEREOF

BACKGROUND OF THE INVENTION

1. Field of the Invention

The present invention relates to a vibration unit, and more particularly to a vibration unit which is light-transmittable and flexible.

2. Description of the Related Art

As piezoelectric materials develops, the size regardless of volume or thickness of actuators including piezoelectric actuators, piezoelectric motors, ultrasonic motors, electrets or related thin actuators made of a piezoelectric material is minimized. Since the principle of piezoelectric effect (which is a prior art technology disclosed years ago, and thus will not be described here) is mainly divided into two types: direct piezoelectric effect and converse piezoelectric effect. If a pressure is applied to a piezoelectric body, then the electric dipole moment of the piezoelectric body will be compressed and shortened together with the material. Now, the resistance against the aforementioned tendency in the piezoelectric body will generate a voltage to maintain the original status of the piezoelectric body, and this effect is called direct piezoelectric effect. On the other hand, if an electric field is applied to the piezoelectric body, the electric dipole moment will be elongated, the piezoelectric body will be extended in the direction of the electric field to convert electric energy into mechanical energy, and this effect is called converse piezoelectric effect. The foregoing piezoelectric actuators and piezoelectric motors, etc are devices having the converse piezoelectric effect and capable of creating mechanical energy such as vibrational energy for producing vibrations.

There are two types of piezoelectric actuators divided according to their applications as follows.

The first type of piezoelectric actuators is to make use of a pure linear displacement of a longitudinal effect and a lateral effect created by the piezoelectric actuator, which the piezoelectric actuator is considered as a linear motor with a micro/nano scale micro-movement capability, whose structure includes a single-layer device, a multi-layer device and a tubular device, etc.

The second type of piezoelectric actuators is a complex curved displacement type capable of producing a relatively larger displacement, and such piezoelectric actuator is composed of a piezoelectric device and other elastic materials, and this type of piezoelectric actuators includes unimorph and bimorph.

The single-layer piezoelectric device comes with a simple structure but generates very small displacement quantity. The single-layer piezoelectric device generally has a thickness approximately ranging from 0.1 mm to 1 mm, and the displacement quantity approximately to 100 nm. In recent years, as the development of micro manufacturing technology of electromechanical systems (MEMS) advances, there is a trend of changing piezoelectric materials into thin films with a response frequency ranging from 100 MHz to several GHz. The way of driving a single-layer piezoelectric device is to apply a voltage in the direction of the thickness of the piezoelectric device, such that a polarization occurs inside the material to produce contractive and expansive deformations. Because the behavior of polarization process similar to the charges which are accumulated to the capacitor, so the piezoelectric device also has the property of a capacitor.

Basically, the multi-layer piezoelectric device is formed by stacking single-layer piezoelectric devices together with one another, and each layer is insulated by a thin film. Generally, the quantity of layers can be ranged from tens to hundreds of layers, so these single-layer piezoelectric devices have a larger displacement quantity ranging from several microns to tens of microns, and a natural frequency ranging from several kHz to 10 kHz. The energy conversion efficiency of the multi-layer piezoelectric device is also higher than that of the single-layer piezoelectric device. Each single-layer piezoelectric device is isolated by an electrode, and the polarization direction of each single-layer piezoelectric device is opposite to the polarization direction of an adjacent single-layer piezoelectric device. Although the mechanical structure is a serially connected structure, the electric property is of a parallel type. A voltage is applied to each single-layer piezoelectric device simultaneously for driving the device, such that the single-layer piezoelectric device can be shifted and changed in polarization direction.

In present existing technologies, the use of piezoelectric actuators, piezoelectric motors, ultrasonic motors, electret or related thin actuator is very popular. For example, a mini supersonic transducer of a flexible substrate as disclosed in TW Pat. Publication No. 575024 comprises: a substrate, made of a flexible material, and having a first surface and a second surface disposed on top and bottom sides of the first substrate respectively, wherein both sides of the first surface have a lead frame to constitute a support structure by flexibility; and a vibrating film, having a first surface and a second surface, wherein the second surface is disposed on a lead frame; and a plurality of first electrodes and second electrodes, wherein the first electrodes are disposed on the substrate, and the second electrodes are disposed on the vibrating film. With the aforementioned assembly, the conventional supersonic transducer can achieve the effects of simplifying the manufacturing procedure, increasing the deformation of the vibrating film and the effective sensing area between the driving and sensing electrodes, reducing the effect between impedance and a matched layer, increasing the detection sensitivity and enhancing the performance without incurring a higher cost. Although this published patent has disclosed a flexible supersonic transducer, yet the flexible supersonic transducer lacks of light-transmittably, and produces very limited vibrations for its application in a speaker. So the transducers of this sort cannot be used as a primary device for producing vibrations.

In addition, a no-bias analog resistive touch display panel as disclosed in TW Pat. No. I249708 comprises a core layer made of an electret material having a piezoelectric effect, a transparent conductive film layer formed on upper and lower surface of the core layer separately, a highly conductive metal electrode formed at each edge of the conductive film layer on one of the surfaces of the core layer, and a transmission line electrically coupled to the electrode and a controller. If the no-bias analog resistive touch display panel is touched, a potential difference will be produced between the conductive film layers of the upper and lower surfaces of the core layer by the piezoelectric effect of the electret. Since the distance between the touched point and each conductive metal electrode disposed on the conductive film layer varies, the impedance is different, so that each electrode generates a corresponding current signal according to the potential difference and impedance, and the transmission line electrically coupled to the electrode is provided for outputting the current signal to the controller for detecting position coordinates of the touched point after correction is made. Obviously, the aforementioned converse piezoelectric effect is applied in the aforementioned issued patent, wherein a transparent electret together with a potential sensing are used for the touch display panel. In the field and application of flexible touch display panels, the deformation rate generated by rolling the touch display panels will be different and a large quantity of electric potential energies will be produced, and thus the aforementioned invention cannot be applied to a primary device for producing vibrations.

As the development of the touch control technology advances, a purely touch control no longer can meet the user requirements anymore. When a general user operates a touch display panel, the user is limited by factors including the sensing sensitivity of the touch display panel, the response time of the operating system, and the different personal tactile sensing, and the user usually cannot determine instantly whether or not a touch operation is completed. To let users be able to immediately sense an end of a touch control action, some manufacturers connect the foregoing actuator to the bottom of a general touch display panel.

After a user touches the touch display panel by a touch object such as the user's hand or stylus, the actuator produces vibrations immediately, so that the user can sense the end of the touch action by the feedback of vibrations, and such feedback is called touch feedback or tactile feedback in present existing technologies.

It is expected that the actuator is limited by the properties of its material which the light cannot be penetrated through when the actuator is coupled to the touch display panel, the actuator cannot be installed only at the bottom of the touch display panel in order to avoid blocking the screen displayed by the touch display panel. Before a vibration produced by the actuator is transmitted to the touch object such as the user's hand or stylus, vibration waves have to pass through the touch display panel and the display panel (wherein the touch panel generally has a layer of touch display panel and a layer of display panel installed at the bottom of the touch panel), and the vibrational force is absorbed substantially after the vibration waves pass through two layers of panels with different properties. As a result, the user cannot sense the touch feedback for sure.

Although the touch display panel with the design of a touch feedback allows users to know about the completion of a touch control action, users need healthy eyes to operate such display panel, but users with a visual impairment such as blind people or cataract patients are unable to use such touch display panel.

SUMMARY OF THE INVENTION

In view of the foregoing needs, the inventor of the present invention based on years of experience in the related industry to conduct extensive researches and experiment, and finally designed a novel light-transmitting vibration unit and a module thereof.

Therefore, it is an objective of the present invention to provide a light-transmitting vibration unit.

An objective of the present invention is to provide a flexible vibration unit.

An objective of the present invention is to provide a light-transmitting vibration unit directly coupled to a surface of a touch panel.

An objective of the present invention is to provide a light-transmitting vibration module.

An objective of the present invention is to provide a flexible vibration module.

An objective of the present invention is to provide a light-transmitting vibration module directly coupled to a surface of a touch panel.

An objective of the present invention is to provide a light-transmitting vibration module capable of producing local vibrations.

An objective of the present invention is to provide a light-transmitting vibration module capable of producing a sense of touch.

An objective of the present invention is to provide a light-transmitting vibration module operable by people with a visual impairment.

To achieve the aforementioned objectives, the present invention provides a light-transmitting vibration unit comprising a first substrate and a second substrate stacked under the first substrate, wherein the first and second substrates are made of a conductive polymer material selected from fluorine polymer, fluorine ethylene propylene (FEP), polytetrafluoroethylene (PTFE), polyvinylidene fluoride (PVDF), silicon nitride ($Si_3N_4$) and Teflon, cyclo olefin copolymer (COC), and these types of materials come with an electro-conductive property and a light transmittance, so that after the first substrate and the second substrate are stacked with each other, an electric field is formed for converting electric energy into mechanical energy to produce vibrations.

In addition, the conductive polymer material can be a plastic material added with a conductive material. In order to allow a plastic material such as silicone, polyimide photo resist, resin, plastic, polyethylene terephthalate (PET), polycarbonate (PC), polyethylene (PE), polyvinylchloride (PVC), polypropylene (PP), polystyrene (PS), polymethyl methacrylate (PMMA) or any mixture of these plastic polymers to have an electro-conductive property, a conductive material such as an N-type transparent conductive material composed of an impurity-doped oxide, a binary compound or a ternary compounds, or a P-type transparent conductive material such as lattice-structured americium dioxide ($AMO_2$) composed of monovalent and trivalent metal ions is used for providing a uniform resistance on the whole or all surfaces of the plastic material and an electro-conductive property to the plastic material through a doping or coating technology (including evaporation, sputtering, and electroplating, etc). With the plastic property of the plastic material, the first and second substrates have the properties of light transmittance and flexibility. With the electric property of the conductive material, the first and second substrates have the properties of uniform resistance at the surfaces or the interior and become electro-conductive plastic plates.

After a vibration driven component is electrically coupled to the first and second substrates, and the vibration driven component generates a sinusoidal signal or an electric signal with varying oscillations, and an electric field is applied to the first and second substrates, the electric dipole moment of the first and second substrates will be elongated, such that the first and second substrates are extended along the direction of the electric field for converting electric energy into mechanical energy to produce vibrations.

If the vibration unit is coupled to a preinstalled touch-sensitive display unit for performing a touch operation, the vibration unit will produce an instant vibration to constitute a so-called touch feedback (or tactile feedback). To achieve a more significant touch feedback effect, the vibration unit can be coupled directly onto the touch panel of the touch-sensitive display unit. In other words, if a touch object such as a finger or a stylus is used for the touch operation, the touch object can be operated on the vibration unit directly to achieve the touch feedback effect to provide vibrations more directly and specifically. Since the vibration unit is made of a plastic material with light transmittance, the image produced by the touch-sensitive display unit can be passed directly through the vibration unit.

The aforementioned vibration units can be further coupled in a modular form, and arranged into a matrix or an array, such that several vibration units can be combined into a vibration module. In an assembling process, the vibration units can be equal or different in size, and have a geometric shape selected from the collection of a rectangle, a circle, a parallelogram, a rhombus, a rectangle, a square, a hexagon and a polygon.

After the vibration module and the touch display panel are coupled, one or more vibration units produce vibrations to achieve the function of producing vibrations in a local area. Since the vibration module is composed of vibration units, therefore a larger number of vibration driven components can be installed with a higher density per unit area. After the local vibrations are produced by the vibration units, the vibrations can be arranged into texts or patterns.

To facilitate an operation by persons with a visual impairment, the electric signal passing through the vibration unit is enhanced slightly. In other words, the vibration driven component is able to generate a higher voltage. For instance, the voltage intensity used in Chinese medicine and physical therapy is increased in such a way that a slight muscle movement is produced in human dermis or subcutaneous tissue after the electric signal is passed, and such increase of voltage intensity causes no harm to users.

It is noteworthy to point out that each vibration unit in the vibration module is considered as a resistor, regardless of its connection method. After an electric signal is passed through the vibration unit, a potential difference is created on the vibration unit. Since human skin has slight impedance, therefore after a user having a visual impairment touches one or more vibration units by a finger or a palm, a slight numb feeling occurs in the epidermis of the user's finger or palm. The numb feeling of this sort produced by an electric stimulation together with the vibration units arranged into a matrix or an array provides a tactile sensing effect for Braille texts.

DETAILED DESCRIPTION OF THE PREFERRED EMBODIMENTS

To make it easier for our examiner to clearly understand the technical characteristics of the invention, we use the following preferred embodiments together with the attached drawings for the detailed description of the invention.

Figure 1:
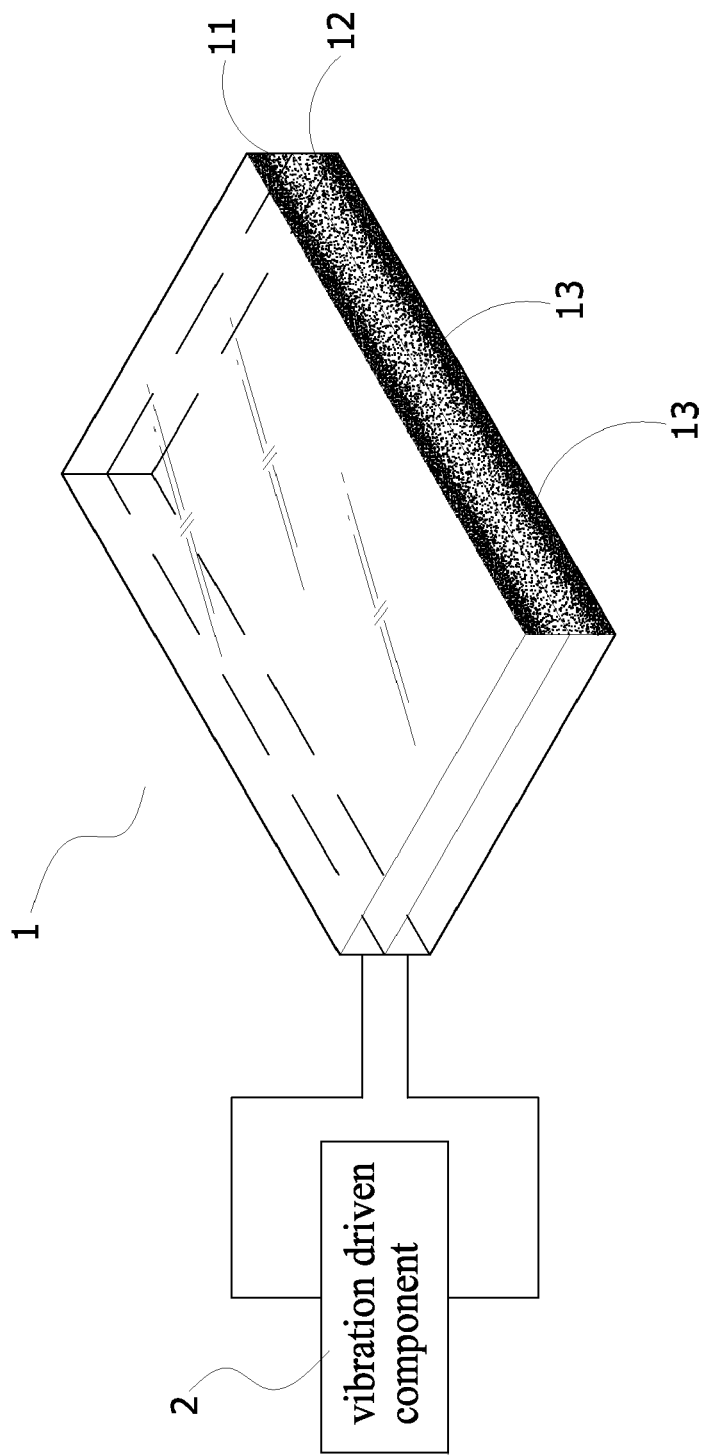
FIG. 1 is a perspective cross-sectional view of a first preferred embodiment of the present invention.
Figure 2:
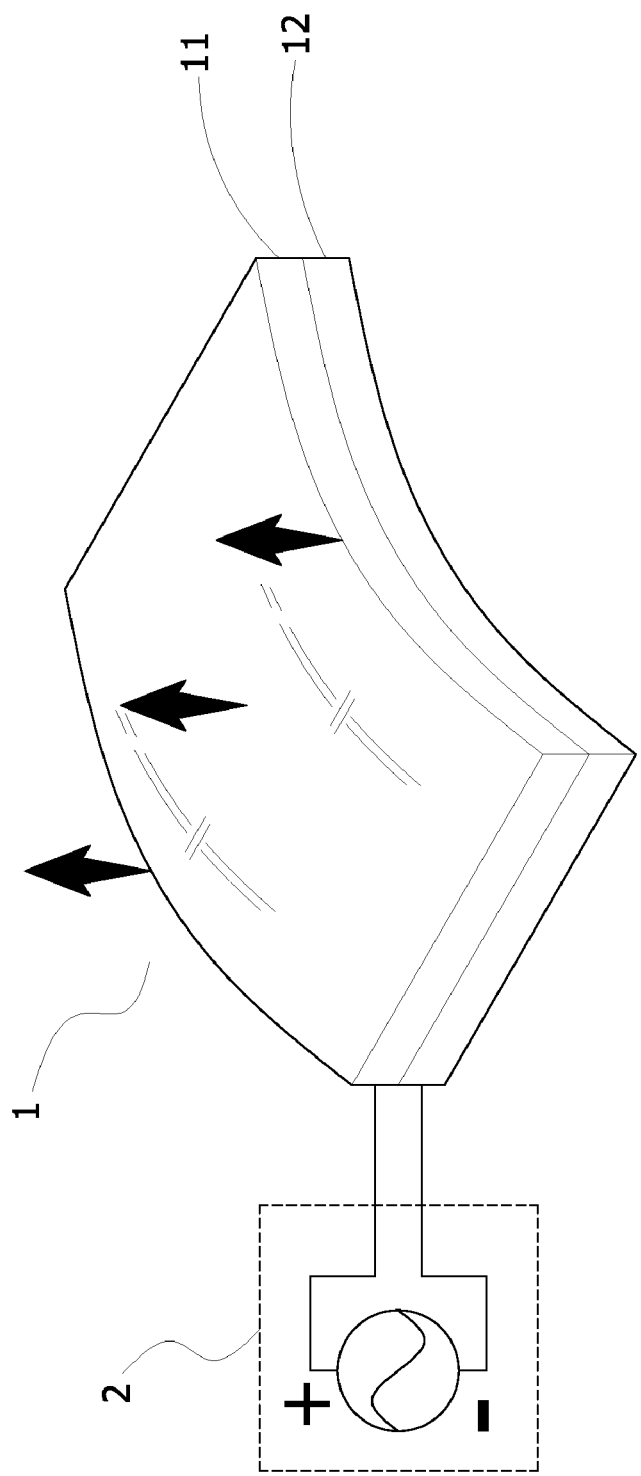
FIG. 2 is a schematic view of a first movement in accordance with a first preferred embodiment of the present invention.
Figure 3:
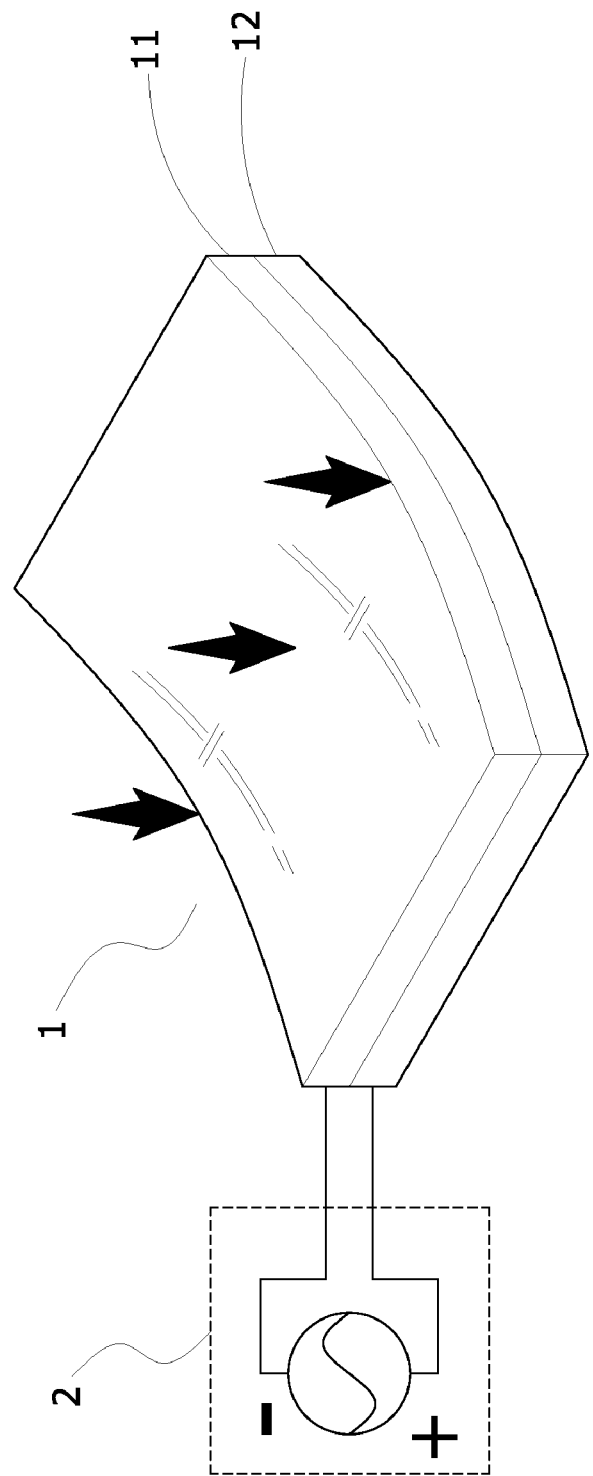
FIG. 3 is a schematic view of a second movement in accordance with a first preferred embodiment of the present invention.

With reference to FIGS. 1 to 3 for a perspective cross-sectional view and schematic views of movements in accordance with a preferred embodiment of the present invention, the light-transmitting vibration unit includes a vibration unit 1, comprising a first substrate 11, a second substrate 12 and a preinstalled vibration driven component 2.

The first substrate 11 is made of a light-transmitting plastic material, and doped with a conductive polymer material 13, such that the first substrate 11 has the properties of flexibility, light transmittance and internal uniform resistance.

The second substrate 12 is stacked onto the bottom of the first substrate 11. Similar to the first substrate 11, the second substrate 12 has the properties of flexibility, light transmittance and internal uniform resistance. The second substrate 12 is also made of a light-transmitting plastic material and doped with a conductive polymer material 13.

The aforementioned plastic material is a material selected from the collection of silicone, polyimide photoresist, resin, plastic, poly(ethylene terephthalate) (PET), polycarbonate (PC), polyethylene (PE), polyvinylchloride (PVC), polypropylene (PP), polystyrene (PS), polymethyl methacrylate (PMMA) and a mixture of plastic polymers. A film or plate made of the plastic material provides good flexibility and light transmittance.

The aforementioned conductive polymer material 13 is mainly divided into two types, respectively: a P-type conductive material and an N-type conductive material, wherein the N-type conductive material is a material selected from the collection of an impurity-doped oxide, a binary compound or a ternary compound.

The aforementioned impurity-doped oxide is an oxide selected from the collection of indium tin oxide (ITO), indium zinc oxide (IZO), Al-doped ZnO (AZO) and antimony tin oxide (ATO).

The aforementioned binary compound is a compound selected from the collection of tin dioxide mixed with indium oxide ($SnO_2+In_2O_3$), zinc oxide mixed with tin dioxide ($ZnO+SnO_2$) and zinc oxide mixed with indium oxide ($ZnO+In_2O_3$).

The aforementioned ternary compound is a compound selected from the collection of cadmium tin oxide ($Cd_2SnO_4$, $CdSnO_3$), cadmium indium oxide ($CdIn_2O_4$), zinc indium oxide mixed magnesium indium oxide ($Zn_2In_2O_5+MgIn_2O_4$), zinc indium oxide mixed zinc indium oxide mixed with indium-tin oxide complex ($Zn_2In_2O_5+In_4Sn_3O_{12}$, $ZnSnO_3+In_4Sn_3O_{12}$).

The aforementioned P-type conductive material is a material selected from lattice-structured americium dioxide ($AMO_2$) composed of monovalent and trivalent metal ions, and the monovalent metal ion is one selected from the collection of lithium (Li) ion, copper (Cu) ion and silver (Ag) ion, and the trivalent metal ion is one selected from the collections of aluminum (Al) ion, gallium (Ga) ion and indium (In) ion.

Besides the P-type or N-type conductive material, the conductive material can also be carbon nanotube, and the carbon nanotube can be divided into single-walled carbon nanotube (SWNT) and multi-walled carbon nanotube (MWNT), and the single-walled carbon nanotube (MWNT) can be subdivided according to its structure into three types: armchair nanotube, zigzag nanotube, and chiral nanotube. The carbon nanotube transparent conductive film of the invention is formed by coating carbon nanotube dispersive liquid uniformly onto a surface of the plastic substrate, and then filling an adhesive into gaps of a scattered carbon nanotube network, or using an adhesion layer for spraying or dipping carbon nanotubes onto the surface of the substrate.

It is noteworthy to point out that the aforementioned conductive material is a common material, and the present invention is not limited to such material only, but any material capable of providing the electro-conductive property of the plastic film can be used in the invention.

After the first substrate 11 and the second substrate 12 are made of a light-transmitting plastic material and doped with a conductive polymer material 13, the first substrate 11 and the second substrate 12 have the properties of light transmittance and flexibility due to the plastic property of the plastic material, and the first substrate 11 and the second substrate 12 also have the uniform resistance due to the electric property of the conductive polymer material, such that the first substrate 11 and the second substrate 12 become electro-conductive plastic plates.

In addition to the way of adopting the light-transmitting plastic material doped with the conductive polymer material 13, the first substrate 11 and the second substrate 12 also can be made of fluorine polymer, fluorine ethylene propylene (FEP), polytetrafluoroethylene (PTFE), polyvinylidene fluoride (PVDF), silicon nitride ($Si_3N_4$), Teflon, cyclo olefin copolymer (COC) or a conjugated conductive plastic, and the conjugated conductive plastic is a conjugated conductive polymer selected from the collection of 3,4-ethylenedioxythiophene (PEDOT), polyaniline and polypyrrole. Besides, the polyacetylene is one selected the collection of aliphatic linear conjugated conductive polymers, the polyaniline is one selected the collection of aromatic linear conjugated conductive polymers, and the polypyrrole is one selsected the collection of aromatic heterocyclic polymers.

Since the conjugated conductive plastic is an electronic conductive polymer having a larger $\pi$ electron conjugated system within the polymer molecular structure, and the $\pi$ valence electron has a larger delocalized property that can be shifted in the system, therefore the $\pi$ valence electron can produce a current in a fixed direction within the material to give an electro-conductive property when an external electric field exists. The electric conductivity is related closely to the size of conjugated system, the doping condition, the type of doping agent, and the extent of doping. Unlike a metal conductor, the conjugated conductive plastic has a positive temperature coefficient, which means the higher of the temperature, the higher of the electric conductivity.

If a specific voltage is applied to both ends of the conjugated conductive plastic, then a current in a specific direction is passed through the material to provide an electro-conductive property similar to that of a metal conductor. According to the structural characteristics and the principle of conduction, the conjugated conductive plastic can be divided into a complex type and a structure type. The former is produced by adding an electro-conductive material such as charcoal or metal powder into a plastic material or rubber, and the related products generally include electro-conductive rubber, electro-conductive coating, organic electrothermal device, resistor, electromagnetic shielding material and electro-conductive adhesive, etc. The later is produced by a chemical synthesis, a photochemical synthesis and an electrochemical synthesis, and whose electro-conductivity is related directly with the chemical structure and the doping condition, and can be further divided into electronic conductive polymer, ionic conductive polymer and oxidation-reduction conductive polymer. The electronic conductive polymer is mainly used as a material for an electrode and a display, and some of these conductive materials have an electric conductivity approaching to the copper. The ionic conductive polymer is also called a polymer electrolyte, and primarily used as a solid electrolyte. The oxidation-reduction conductive polymer is used extensively for surface modifications of electrodes and manufacture or research of molecular/electronic equipments. Besides the electric conductivity, the conductive polymer also features the flexibility, film formation, transparency and adhesiveness of a polymer and facilitates a manufacturing and shaping process to manufacture products in various different shapes. Thus, the conductive polymer can be used extensively in the fields of electro-conductive coating, electro-conductive glue, electro-conductive plastic, electro-conductive film, electro-conductive rubber, and electro-conductive device.

The vibration driven component 2 is electrically coupled to the first substrate 11 and the second substrate 12, and the vibration driven component 2 can produce a sinusoidal signal or an electric signal with varying oscillation. If an electric field is applied to the first substrate 11 and the second substrate 12, then the electric dipole moments of the first substrate 11 and the second substrate 12 will be elongated, and the first substrate 11 and the second substrate 12 will be extended in a direction of the electric field for converting electric energy into mechanical energy to produce vibrations. The vibration in this embodiment is conducted in a vertical direction (or vertically up and down).

The aforementioned vibration driven component 2 can be an electronic circuit composed for an integrated circuit, firmware, software or an active/passive component according to the requirements of actual applications.

From the description above, the vibration unit 1 is formed by stacking the first substrate 11 and the second substrate 12 together, and then driven by the vibration driven component 2 to produce vibrations. Therefore, the vibration unit 1 can be a thin vibrator with similar structure or function, and can be a device selected from the collection of a piezoelectric actuator, a piezoelectric motor, an ultrasonic motor, an electret and a related thin vibrator.

Figure 4:
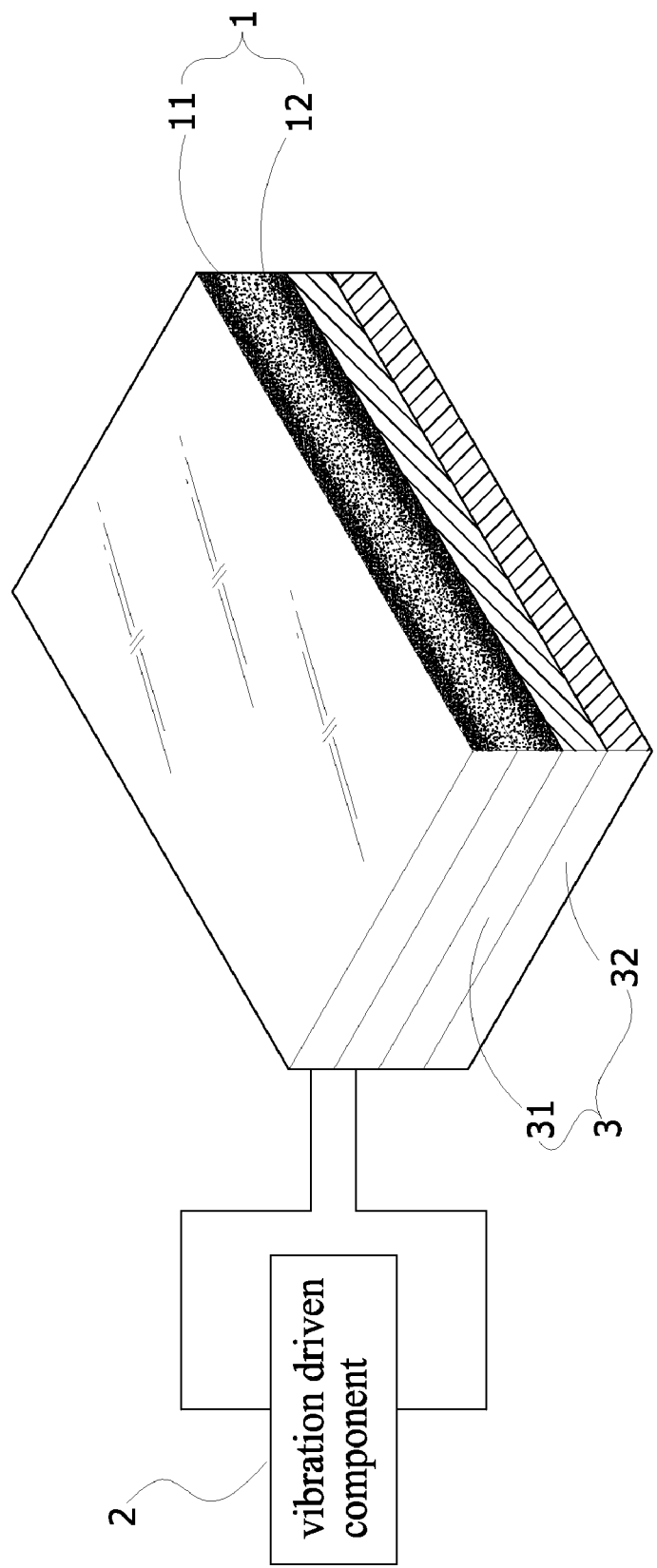
FIG. 4 is a schematic view of a first using status in accordance with a first preferred embodiment of the present invention.

With reference to FIG. 4 for a schematic view of an application in accordance with a preferred embodiment of the present invention, the light-transmitting vibration unit of this embodiment is assembled to a touch-sensitive display unit 3 which is formed by a touch panel 31 and a display unit 32, and the touch panel 31 is stacked onto the display unit 32, and the vibration unit 1 is coupled to the top of the touch panel 31, such that the vibration produced by the vibration unit 1 can be transmitted directly to a touch object such as a finger or a stylus. When the touch object, such as a finger or a stylus is operated, the touch object is operated on the vibration unit 1 directly to achieve the touch feedback for producing vibrations more directly and specifically. Since the vibration unit 1 is made of a plastic material having light transmittance, therefore an image produced by the touch-sensitive display unit 3 can be passed directly through the vibration unit 1.

Figure 5:
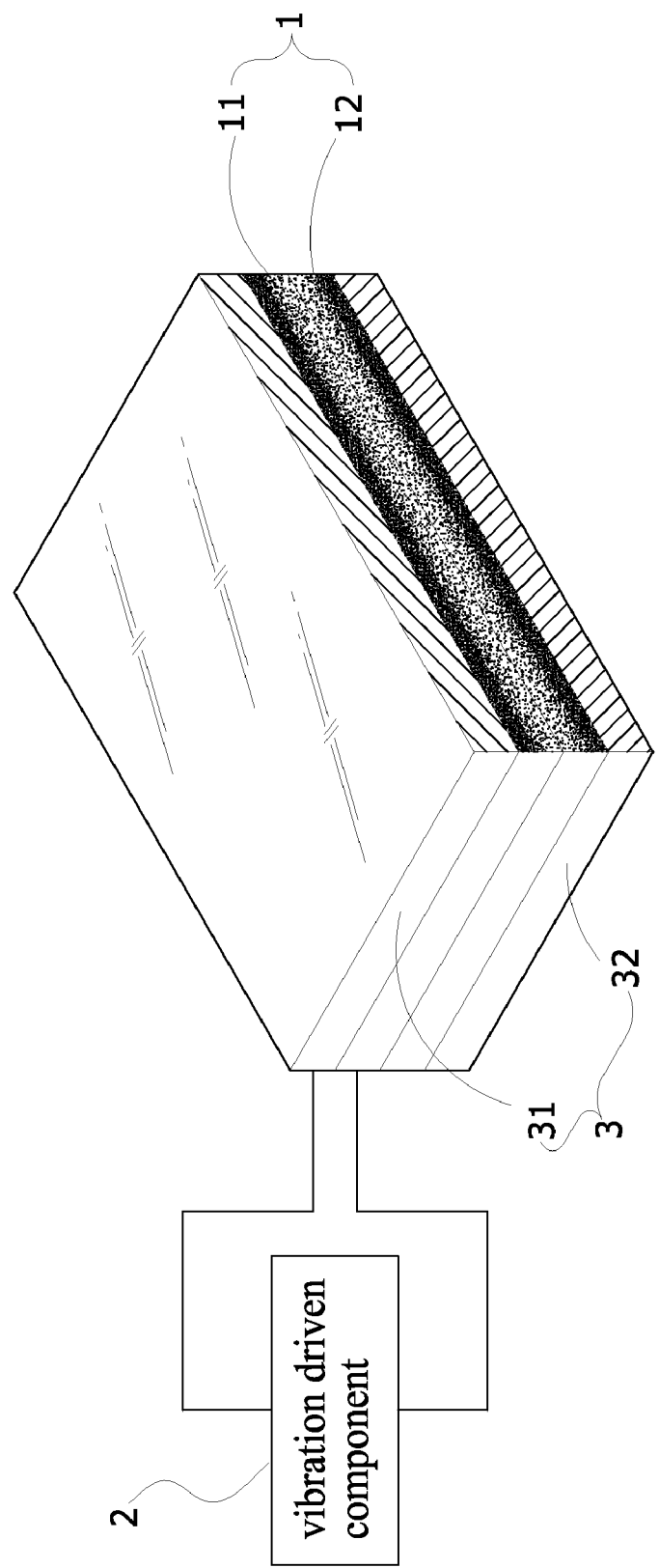
FIG. 5 is a schematic view of a second using status in accordance with a first preferred embodiment of the present invention.

With reference to FIG. 5 for a schematic view of an application in accordance with another preferred embodiment of the present invention, the difference of this embodiment from the embodiment illustrated by FIG. 4 resides on that the vibration unit 1 is coupled between the touch panel 31 and the display unit 32. In the embodiments as shown in FIGS. 4 and 5, the display unit 32 is a cathode ray tube (CRT) display unit, a liquid crystal display (LCD), an organic light emitting diode (OLED) display unit, a vacuum fluorescent display (VFD), a plasma display panel (PDP), a surface conduction electron-emitter display (SED), a field emission display (FED) or an E-paper. These display units 32 can be used for the invention, but the invention is not limited to these display units 32 only. If the display unit 32 is a liquid crystal display (LCD), it can be a liquid crystal display (LCD) selected from the collection of a twisted nematic (TN) liquid crystal display, a vertical alignment (VA) liquid crystal display, a multi-domain vertical alignment (MVA) liquid crystal display, a patterned vertical alignment (PVA) liquid crystal display, an in-plane switching (IPS) liquid crystal display, a continuous pinwheel alignment (CPA) liquid crystal display, and an optical compensated bend (OCB) liquid crystal display; if the display unit 32 is an organic light emitting diode (OLED) display unit, it can be an organic light emitting diode (OLED) display unit selected from the collection of an active matrix organic light emitting diode (AMOLED) display unit and a passive matrix organic light emitting diode (PMOLED) display unit.

The touch panel 31 is one selected from the collection of a resistive touch panel, a capacitive touch panel, an infrared touch panel, an optical touch panel and a supersonic touch panel.

Figure 6:
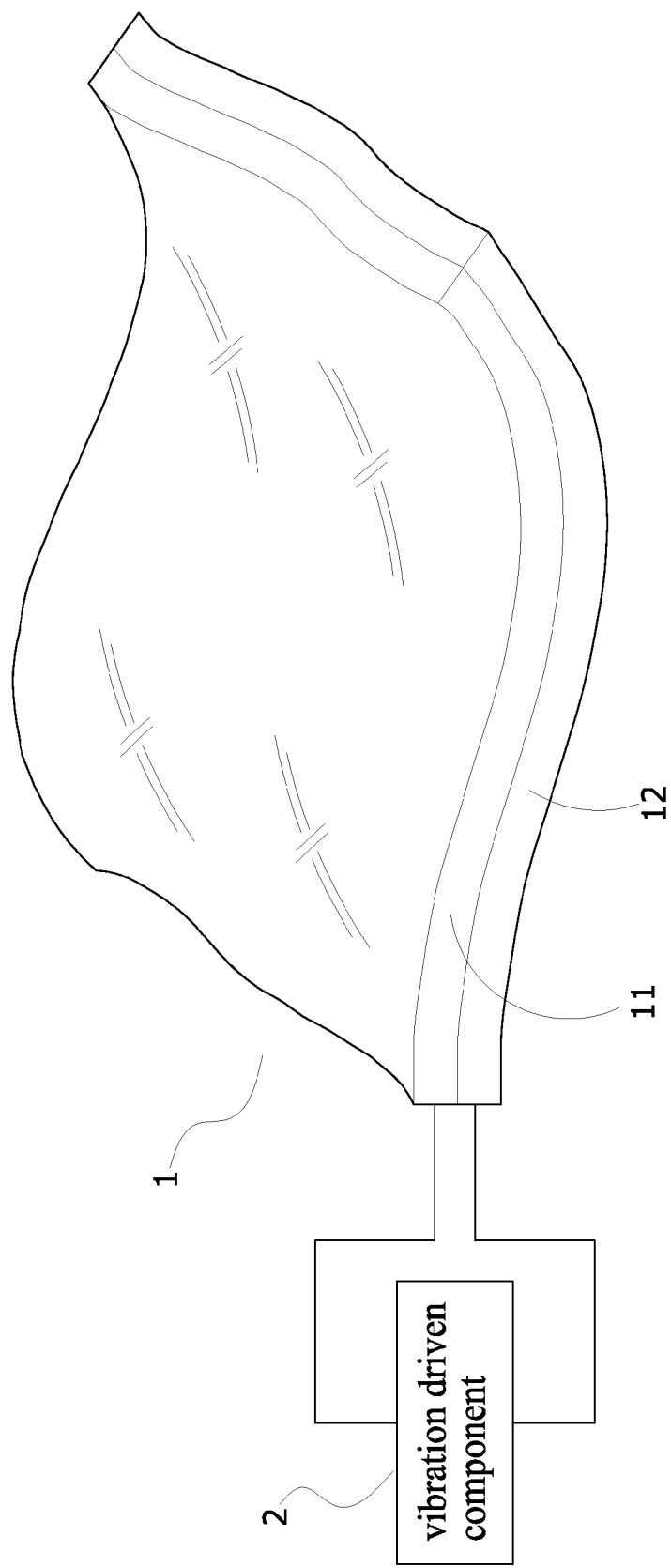
FIG. 6 is a schematic view of a third using status in accordance with a first preferred embodiment of the present invention.

With reference to FIG. 6 for a schematic view of an application in accordance with a further preferred embodiment of the present invention, this embodiment is provided for illustrating the flexibility of the first substrate 11 and the second substrate 12. Since the first substrate 11 and the second substrate 12 are made of a plastic material and most plastic materials come with a specific flexibility, therefore the first substrate 11 and the second substrate 12 have the flexibility, and the vibration unit 1 can be coupled onto a flexible display, such as an E-paper.

Figure 7:
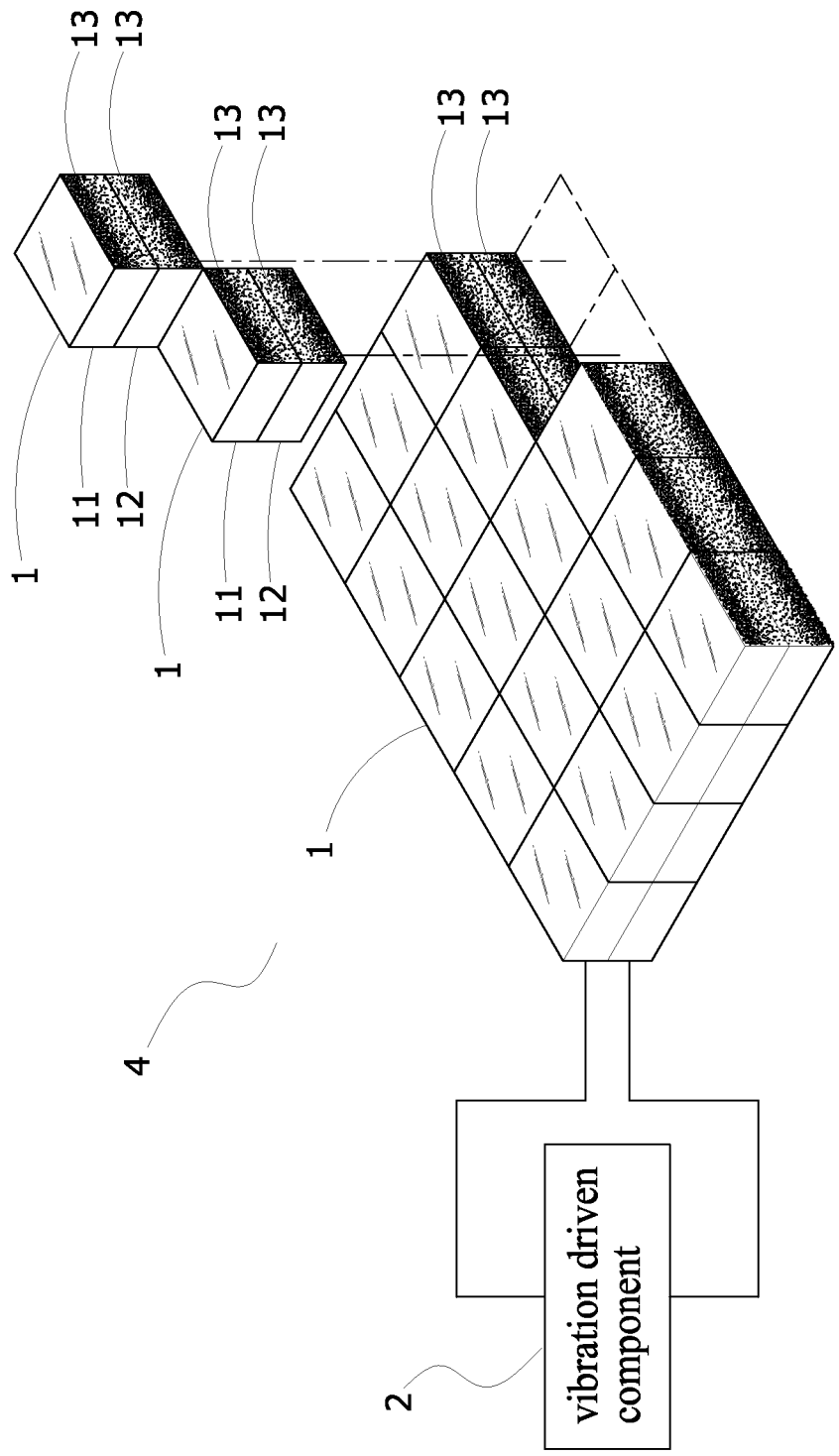
FIG. 7 is a perspective view of a second preferred embodiment of the present invention.
Figure 8:
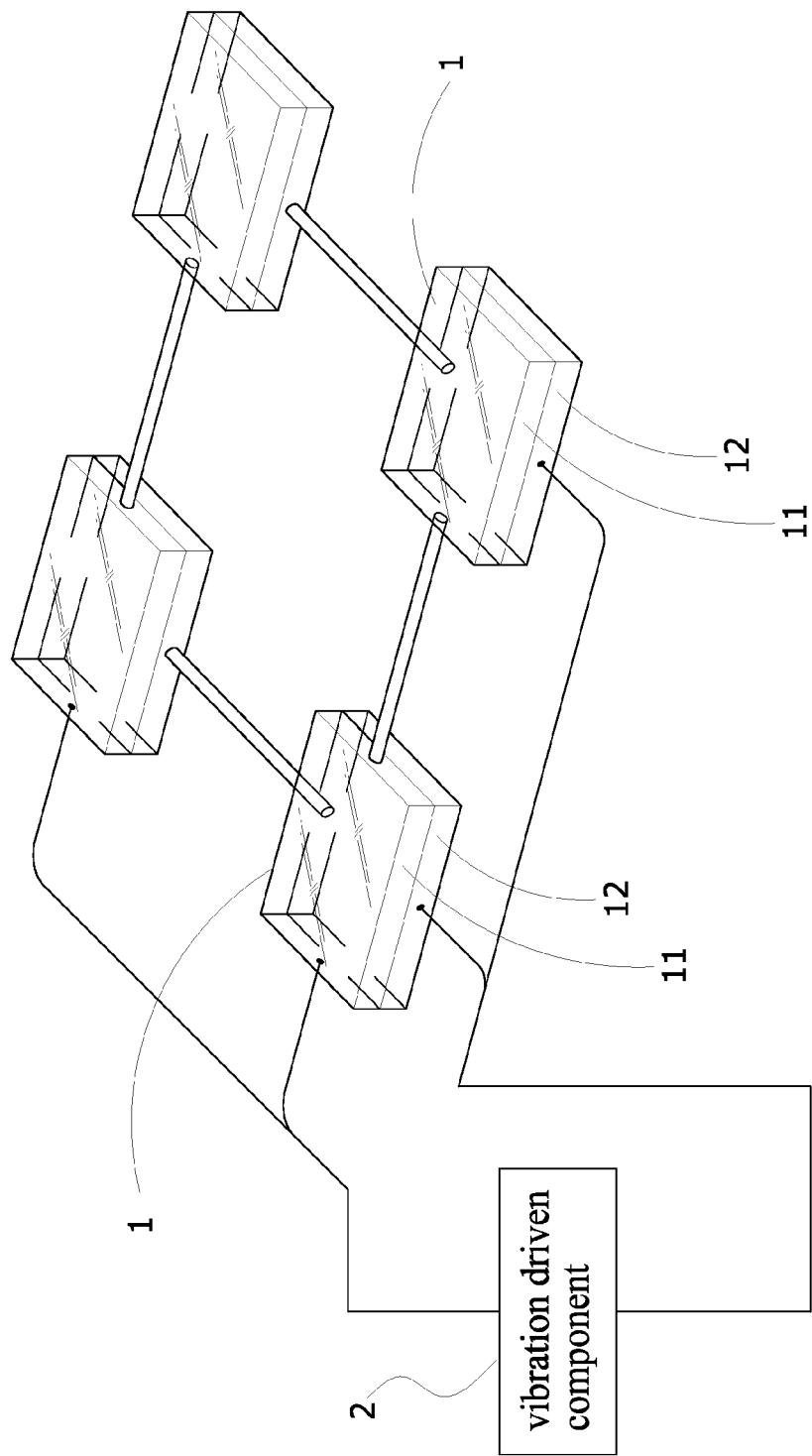
FIG. 8 is a partial schematic view of a second preferred embodiment of the present invention.

With reference to FIGS. 7 and 8 for a perspective view and a partial schematic view of another preferred embodiment of the present invention, a light-transmitting vibration module of the invention includes a vibration module 4 composed of a plurality of vibration units 1, wherein the vibration units 1 have been described and illustrated in FIGS. 1, 2 and 3 already.

The touch feedback process of this embodiment is described as follows:

If a touch object is used for performing a touch operation of the touch panel 31, the touch panel 31 will compute and record the moving track of the touch object. If the touch object performs a single-point or multi-point touch operation, then the touch panel 31 will produce a moving track of a single-point or multi-point contact correspondingly. If the touch object is a single-point or multi-point touch object and moves continuously, then the touch panel 31 will produce a moving track of continuous single-point or multi-point movements correspondingly.

After that, the vibration driven component 2 receives the moving track, locates the corresponding vibration unit 1 according to the moving track, and drives the vibration unit 1 to produce vibrations.

In summation of the results of the aforementioned procedure, it is clear that after the vibration units 1 are arranged into a matrix or an array and installed to the touch-sensitive display unit 3 to achieve a contact with the touch object, vibrations are produced at the position of the touch point only (which is the same position where the touch object touches the touch panel 31), and no vibration will be produced at any other position of the vibration unit 1.

As mentioned above, the vibration unit 1 and the touch object are in contact with each other to produce vibrations in accordance with the present invention. To improve the variation of the touch vibrations, the present invention further features the following vibration effects in its practical use:

Tracking Vibration: If the touch object touches the touch panel 31, the vibration unit 1 will produce vibrations at the first contact position. Meanwhile, the touch object starts moving on the touch panel 31, and the touch object keeps touching the touch panel 31 and moving on the surface of the touch panel 31 continuously. Now, the displacement path of the touch object will produce vibrations with respect to the corresponding vibration unit 1. For instance, if the displacement path of the touch object is L-shaped, then the corresponding vibration unit 1 will produce vibrations under an L-shaped path.

Varying Vibration: If the touch object touches the touch panel 31, the vibration unit 1 will start producing vibrations as well as producing a vibration variation according to the contact time and pressure of a sensing touch control of the touch panel 31. For instance, the larger the pressure of the contact, the larger is the number of vibrations or the force. As a result, the present invention can notice users about an excessive force of a contact to avoid damages due to the too-large pressure. The longer the contact time, the number of vibrations or the force becomes larger. Thus, the increase or decrease of the contact time corresponding to different application programs or touch control programs can produce various touch feedback effects.

It is noteworthy to point out that the vibration module 4 is composed of a plurality of vibration units 1, and thus a higher density or a larger number of vibration units can be disposed per unit area. After the vibration unit 1 produces a local vibration in a unit area, the user can feel the simple text or pattern by touching the touch panel 31.

This embodiment is characterized in that the vibration units 1 are arranged into a matrix or an array, so a plurality of vibration units is assembled to produce a vibration module. In the assembling process, the size of the vibration units can be equal or unequal, and the shape of the vibration unit can be a geometric shape selected from the collection of a quadrilateral, a circle, a parallelogram, a rhombus, a rectangle, a square, a hexagon and a polygon.

The vibration unit 1 is electrically coupled to the vibration driven component 2, such that when the vibration driven component 2 produces a sinusoidal signal or an electric signal with varying oscillations, one of the vibration units 1 can be driven individually to produce vibrations, or a plurality of vibration units 1 can be driven simultaneously to produce vibrations to achieve the effect of producing vibrations at local areas.

By disposing different shapes of vibration units 1, different vibrating areas are produced correspondingly. For example, if the touch area of the aforementioned touch panel 31 is in a polygonal shape, then the whole touch control area can be covered by a polygonal vibration unit 1, so that the vibration produced by the touch operation will not exceed the range of the touch area to avoid users from making a wrong movement or a misjudgment, and enhance the overall accuracy of the touch feedback at the same time.

With the installation of a vibration unit 1 of another shape, the present invention can be coupled to electronic products of various different shapes. In practical applications, a circular display unit or a polygonal display can extend the area of vibrations to every corner of the touch display panel, so as to increase the vibration area effectively.

Figure 9:
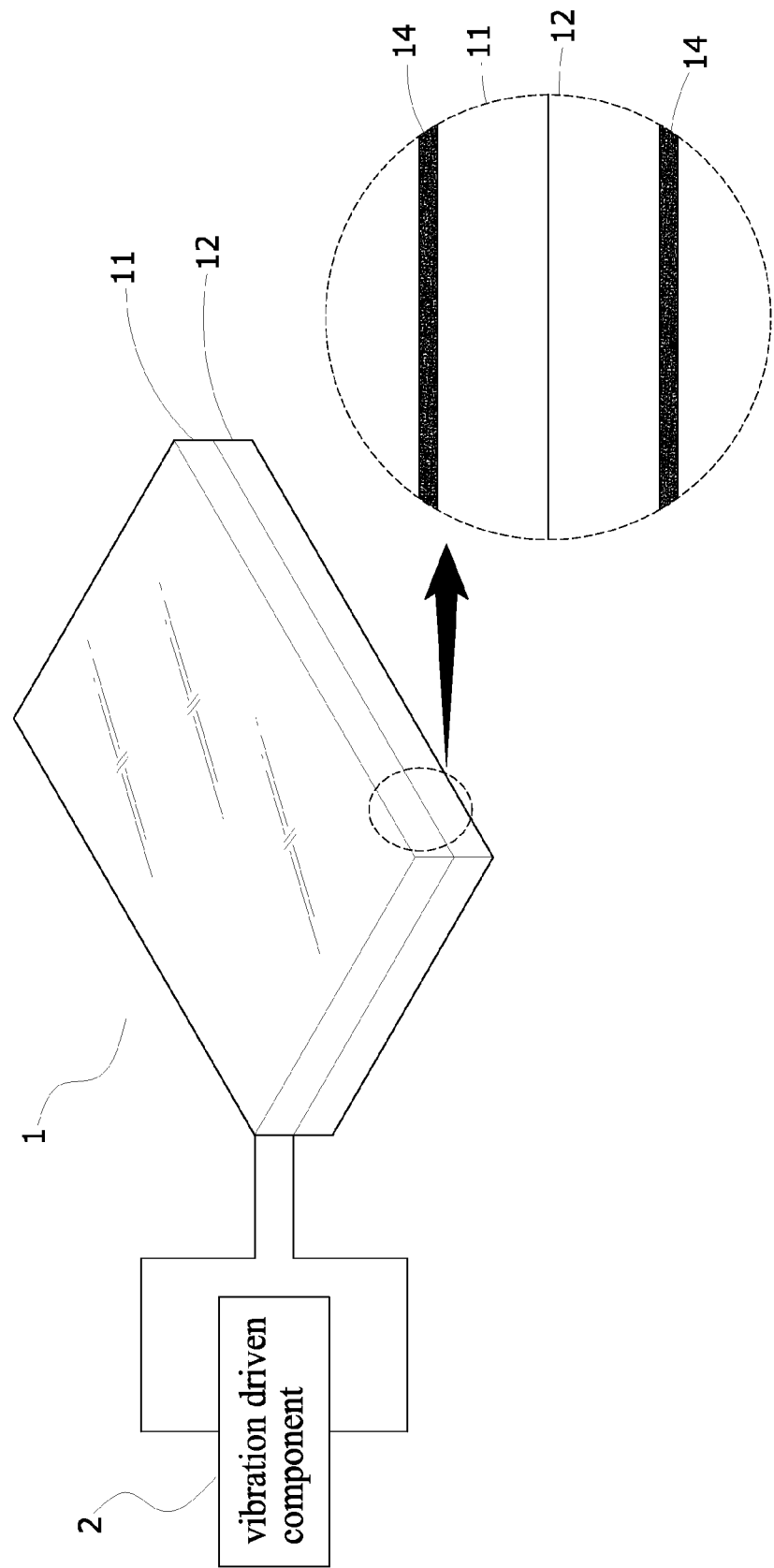
FIG. 9 is a perspective view of a third preferred embodiment of the present invention.

With reference to FIG. 9 for a perspective view and a partial schematic view of a further preferred embodiment of the present invention, the difference between this embodiment and the previous embodiment as illustrated by FIG. 1 resides on that a conductive material 14 is coated onto surfaces of the first substrate 11 and the second substrate 12 of the vibration unit 1 by a coating technology such as evaporation, sputtering or electroplating, and thus the conductive material 14 in accordance with the embodiment as illustrated by FIGS. 8 and 9 is coated onto the surfaces of the first substrate 11 and the second substrate 12 of the vibration unit 1 by the coating technology.

In this embodiment, the first substrate 11 and the second substrate 12 can use the conductive polymer material 13 as illustrated in FIGS. 1 to 3 as the conductive material 14 (and the conductive polymer material 13 has been described above, and will not be described here again), or made of a conductive plastic film, and the conductive material 14 used for making the plastic conductive film can be divided into two main types, respectively: P-type conductive material and N-type conductive material, and the N-type conductive material is one selected from the collection of an impurity-doped oxide, a binary compound, and a ternary compound.

The impurity-doped oxide is one selected from the collection of indium tin oxide (ITO), indium zinc oxide (IZO), al-doped ZnO (AZO) and antimony tin oxide (ATO).

The binary compound is one selected from the collection of tin oxide mixed with indium oxide ($SnO_2+In_2O_3$), zinc oxide mixed with tin dioxide ($ZnO+SnO_2$) and zinc oxide mixed with indium oxide ($ZnO+In_2O_3$).

The ternary compound is one selected from the collection of cadmium tin oxide ($Cd_2SnO_4$, $CdSnO_3$), cadmium indium oxide ($CdIn_2O_4$), zinc oxide mixed with magnesium tin oxide ($Zn_2In_2O_5+MgIn_2O_4$), zinc indium oxide mixed with indium-tin oxide complex ($Zn_2In_2O_5+In_4Sn_3O_{12}$, $ZnSnO_3+In_4Sn_3O_{12}$).

The P-type conductive material is one selected from the collection of a lattice-structured americium dioxide ($AMO_2$) composed of monovalent and trivalent metal ions, and the monovalent metal ion is selected from the collection of lithium (Li) ion, copper (Cu) ion and silver (Ag) ion, and the trivalent metal ion is one selected from the collection of aluminum (Al) ion, gallium (Ga) ion and indium (In) ion.

Besides the aforementioned P-type or N-type conductive material, the conductive material can also be carbon nanotube, and the carbon nanotube is generally divided into a single-walled carbon nanotube (SWNT) and a multi-walled carbon nanotube (MWNT), wherein the single-walled carbon nanotube (MWNT) can be sub-divided into three types, respectively: armchair nanotube, zigzag nanotube, chiral nanotube according to the structure and type, and the carbon nanotube transparent conductive film of the present invention is produced by coating a carbon nanotube dispersive liquid onto a surface of the plastic substrate, and then filling an adhesive into gaps of a carbon nanotube dispersive network or using an adhesion layer for spraying or dipping the carbon nanotube onto the surface of the substrate.

The description above just mentions some common types of conductive materials, and the present invention is not limited to these types of materials only, but any electro-conductive material can be used for the plastic film of the present invention.

Figure 10:
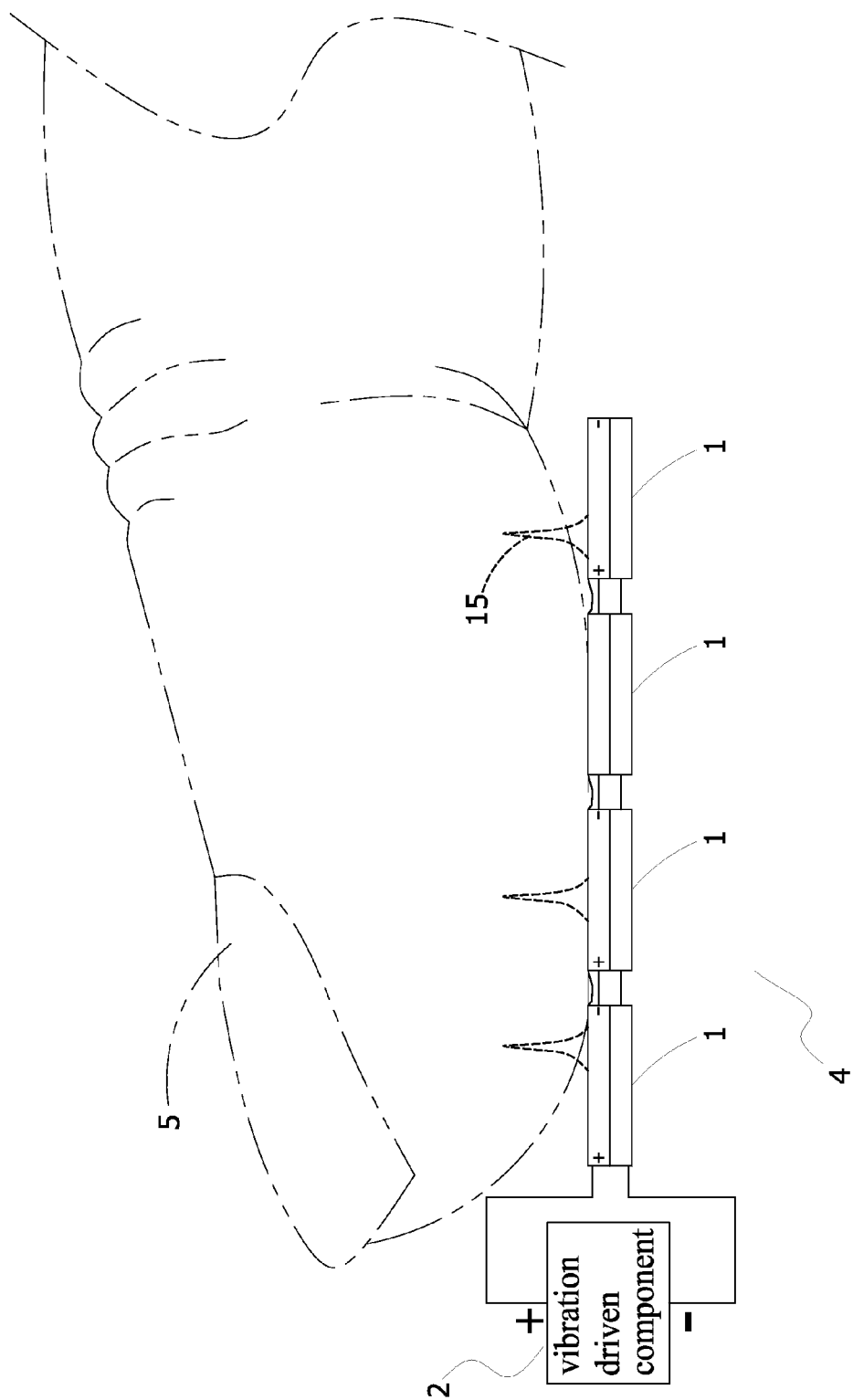
FIG. 10 is a first schematic view of a fourth preferred embodiment of the present invention.
Figure 12:
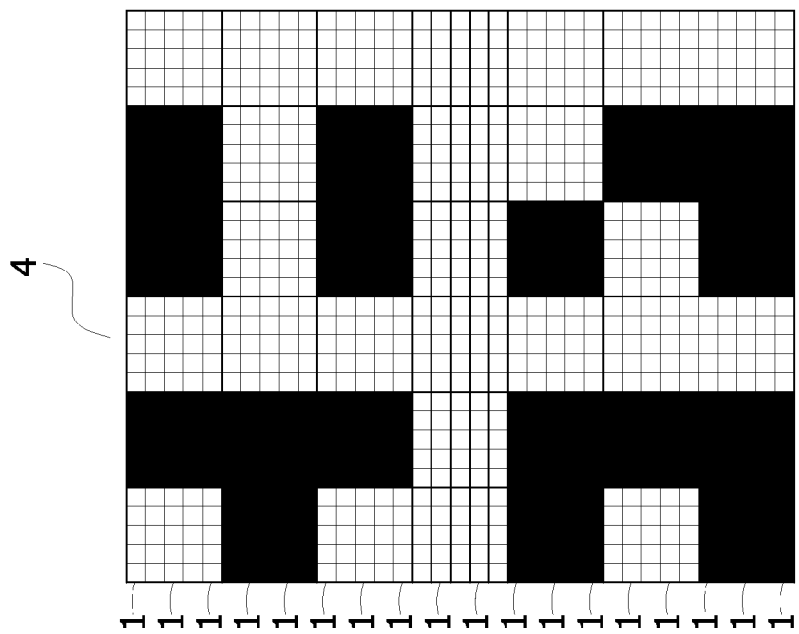
FIG. 12 is a third schematic view of a fourth preferred embodiment of the present invention.
Figure 11:
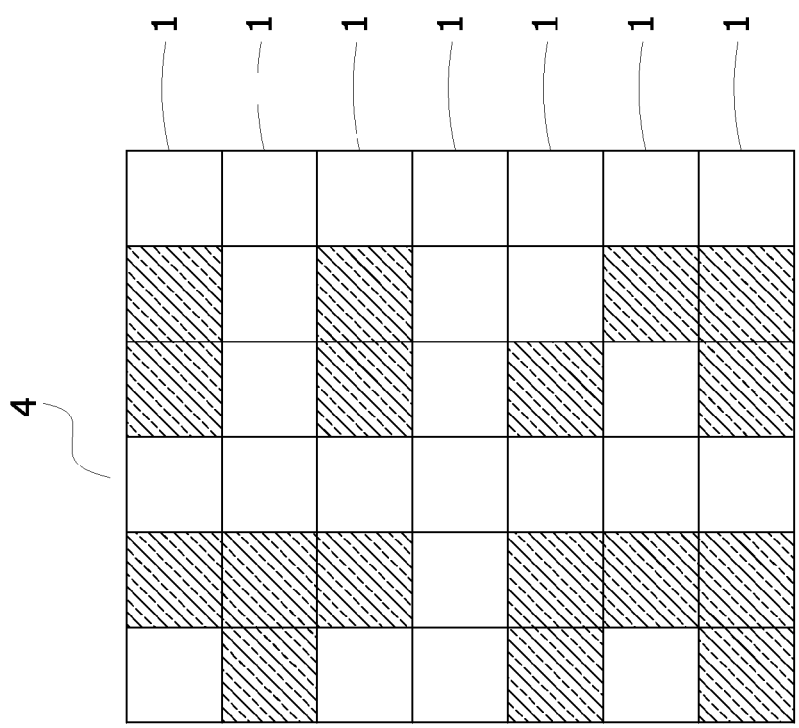
FIG. 11 is a second schematic view of a fourth preferred embodiment of the present invention.

With reference to FIGS. 10 to 12 for schematic views of another preferred embodiment of the present invention, the present invention slightly enhances the electric signal passing through the vibration unit 1 to facilitate the operation by a person with a visual impairment such as cataract, glaucoma or blindness. In other words, the vibration driven component 2 can produce a higher voltage. In order to meet a required medical level bearable by human body, the DC current produced by the vibration driven component 2 must be limited below 65 mA, and the AC current must be limited below 10 mA, or 55 mA at 10000 Hz to meet the requirement of the safety use in human bodies.

The safety relationship between electricity and human body is described as follows. Since human skin is an electro-conductor resistor with a resistance of approximately equal to 500~1500 ohms and the resistance of which will vary with the level of skin dryness, sweat or emotional change of a person. If a current is passed through a person's body, the person will feel the pain of an electric shock, cells will be affected, and the nervous system will be stimulated, such that the muscle becomes involuntary instantly. However, the most dangerous situation to human body occurs when the current passes through a person's heart and disturbs the nerve that controls cardio muscle movements. As a result, the pumping effect is disabled, and the heart cannot be functioned properly to result in a critical condition known as "Ventricular fibrillation".

In general, the internal electric potential of a cell is lower than the electric potential of tissue fluids outside the cell. In other words, the interior of the cell carries a negative potential and the exterior of the cell carries a positive potential, and such negative potential is called a resting membrane potential. If the nerve or muscle is stimulated by electricity, and the excitable tissue is stimulated by electricity, the current passing through a stimulated electrode will cause an electric potential of a hyperpolarization at the positive terminal of the electrode, and a depolarization will occur at the negative terminal of the electrode. In other words, the negative potential of some cell membranes at the negative terminal of the electrode will become smaller or even change to a positive potential. If the voltage or current of the stimulation drives the electric potential of cell membranes near the negative terminal of the electrode to exceed a critical value or a threshold, then an ion channel on the cell membrane will be opened to produce an action potential, and the aforementioned series of activities is the basic principle of the electrically stimulated nerve or muscle.

Therefore, this embodiment applies the foregoing electric stimulation to produce the tactile sensing, such that after a person with a visual impairment to touch one or more vibration units by a finger or a palm, each vibration unit 1 is considered as a resistor, and after an electric signal is passed through the vibration unit 1, a potential difference is formed on the vibration unit 1. Since human skin has a slight impedance, a pulse 15 will be generate to drive epidermis to produce a slight muscle vibration, also referred as slight numb feeling, and the numb feeling caused by the electric stimulation together with the vibration units 1 arranged into a matrix or an array can be used for producing a tactile sensing effect of Braille text, which is the tactile sensing mentioned earlier in the specification.

In FIG. 11, after each vibration unit 1 of the vibration module 4 is vibrated, the way of arranging the Braille text includes W for upper left, X for upper right, Y for lower left and Z for lower right, and each unit point constituting the Braille text is a vibration unit 1.

To achieve a more significant tactile sensing effect for each unit point of the Braille text, we can adopt a plurality of vibration units 1 with a smaller area. In this embodiment, the 6×6=36 vibration units 1 is used to represent a unit point, so that when a person with visual impairment touches the Braille text displayed by the vibration module 4, the person can sense the Braille text more clearly.

In addition to the application to the Braille text, the present invention can further be applied to electronic games, such as a large electronic Mahjong game player having a touch screen, a personal computer or a Microsoft surface computer. If a user touches a tile of Mahjong displayed on a screen, the vibration module 4 together with a Mahjong graphic and text can be used to provide a direct sensing effect of physical texts. In other words, if the Mahjong pattern shown on the screen is "One Circle", then the vibration module 4 will produce vibration matched the shape of the "One Circle", and the aforementioned sensing method for the Braille text allows users to have the tactile sensing of touching the Mahjong on a flat screen. In addition to the electronic Mahjong game, the technology of the present invention can also be applied to an electronic card game. When a user touches a playing card on a flat screen, the user can sense the rank and the suit of the card, and thus the invention can achieve a 3D tactile sensing effect unachievable by the traditional playing card.

To provide diversified applications to the present invention applied to various different electronic games or intellectual games, the vibration driven component 2 can drive the vibration unit 1 to produce different actions at different situational modes according to actual requirements. In the electronic Mahjong game for example, the vibration driven component 2 will drive the vibration unit 1 to produce different vibration modes including continuous vibrations, intermittent vibrations, and continuous vibrations with different cycles, such that a user can know the current situation of the game directly through the vibrations when the user matches a game rule such as "PUNG", "CHOW", "CALL", and "KONG".

Since the vibration unit 1 or the vibration module 4 of the present invention is made of a light transmitting material, therefore the vibration unit 1 or the vibration module 4 can be added onto a surface of a present existing touch-sensitive display unit, or installed directly onto a surface of a touch panel to achieve the aforementioned tactile sensing function.

While the invention has been described by means of specific embodiments, numerous modifications and variations could be made thereto by those skilled in the art without departing from the scope and spirit of the invention set forth in the claims.

In summation of the above description, the light-transmitting vibration unit and the light-transmitting vibration module of the present invention herein enhance the performance than the conventional structure and further comply with the patent application requirements and are duly filed for patent application.

What is claimed is:

1. A light-transmitting vibration unit, comprising:
   a first substrate;
   a second substrate stacked at the bottom of the first substrate;
   a preinstalled vibration driven component electrically coupled to the first substrate and the second substrate, characterized in that the first substrate and the second substrate are made of a light-transmitting conductive polymer material, and the first substrate and the second substrate include a uniform resistance therein; and
   the light-transmitting conductive polymer material for making the first substrate and the second substrate is a conductive polymer material selected from the collection of fluorine polymer, fluorine ethylene propylene (FEP), polyetetrafluoroethylene (PTFE), polyvinylidene fluoride (PVDF), silicon nitride (Si3N4), Teflon and cyclo olefin copolymer (COC).

2. The light-transmitting vibration unit of claim 1, wherein the light-transmitting conductive polymer material is a P-type transparent conductive material selected from the collection of lattice-structured americium dioxides (AMO2) synthesized by a monovalent and trivalent metal ion.

3. The light-transmitting vibration unit of claim 2, wherein the monovalent metal ion is one selected from the collection of lithium (Li) ion, copper (Cu) ion and silver (Ag) ion.

4. The light-transmitting vibration unit of claim 2, wherein the trivalent metal ion is one selected from the collection of aluminum (Al) ion, gallium (Ga) ion or indium (In) ion.

* * * * *